United States Patent [19]

Taylor

[11] Patent Number: 4,673,924
[45] Date of Patent: Jun. 16, 1987

[54] MARITIME WIND SHIFT ALARM SYSTEM AND METHOD OF DETECTING WIND SHIFTS

[76] Inventor: Ritchie S. Taylor, 512 Agua Pl., Seal Beach, Calif. 90740

[21] Appl. No.: 784,785

[22] Filed: Oct. 4, 1985

[51] Int. Cl.⁴ .............................................. G08B 21/00
[52] U.S. Cl. ................................ 340/601; 33/355 R; 73/188; 340/984; 340/688
[58] Field of Search ........................ 340/601, 984–987, 340/688; 73/188, 189; 200/61.58 R, DIG. 19; 33/355 R, 363 L, 322; 114/144 B, 144 E, 293

[56] References Cited

U.S. PATENT DOCUMENTS

| | | | |
|---|---|---|---|
| 215,403 | 5/1879 | Severn | 33/363 L |
| 3,824,575 | 7/1974 | Rich, III | 73/188 X |

Primary Examiner—James L. Rowland
Assistant Examiner—Daniel Myer
Attorney, Agent, or Firm—Charles H. Thomas

[57] ABSTRACT

A system is provided for detecting wind shifts on a floating vessel which is anchored. The system has particular applicability to commercial gill net fishing where a net is set for the night and a fishing boat is tied to the downwind end of the net. The system employs a modified compass which has a compass rose freely rotatable relative to and in electrical isolation from a housing. An electrical contact is mounted on the compass rose and is electrically connected to a power supply and to an alarm. The power supply is also connected to limit contacts on the housing. The limit contacts are initially oriented to locations on opposite sides of the electrical contact on the compact rose when the vessel is anchored to the downwind end of the net to define allowable variations in wind direction. A significant wind shift will reorient the vessel relative to the net to maintain the vessel at a location downwind from its anchoring point on the net. The compass rose remains pointed north while the vessel and the compass housing are rotated about the anchoring point on the net and relative to the compass rose in response to wind shifts. The rotation of the compass housing relative to the compass rose establishes electrical connection through the electrical contact on the compass rose and at least one of the limit contacts, thereby activating an alarm to alert the crew to a wind shift beyond the allowable variations in wind direction.

10 Claims, 7 Drawing Figures

MARITIME WIND SHIFT ALARM SYSTEM AND METHOD OF DETECTING WIND SHIFTS

BACKGROUND OF THE INVENTION

1. Field Of The Invention

The present invention relates to a method and device for detecting shifts in wind direction on a floating, anchored vessel.

2. Description Of The Prior Art

In the conventional practice of commercial gill net fishing, a gill net is set in the sea overnight from a fishing boat, and the fishing boat is anchored, relative to the net, at the downwind end of the net. The net thereby serves as a floating sea anchor.

It is not uncommon for a maritime wind to shift at night, particularly in the vicinity of a land mass. Such wind shifts typically occur very late at night. When the wind significantly shifts in direction, a fishing boat anchored to a net can frequently be blown by the shifting wind back into the net. When this happens there is a considerable likelihood that the fishing boat will foul the net. Also, the fishing boat, blown by a shifting wind, is likely to be blown into the net float line. The net float line is then likely to become fouled in the boat propeller or rudder and the net can collapse, thereby becoming knotted and tangled.

Commercial gill fishing nets are typically about 6,000 feet long and extend to a depth of about 150 feet. Tangles and tears in the net and the net line typically require from hours to weeks of work to recover the net and to repair it.

The present practice in commercial drift net fishing is either to have some crew member stand watch all night to keep track of the position of the boat relative to the net, or to set an alarm which sounds every hour or so. In either event, one or more of the crew is deprived of adequate rest. This leads to inefficiency in the daytime work of commercial gill fishing. Also, the repetitive sounding of an alarm when no wind shift has occurred sometimes leads to complacency and can result in an inadequate assessment of wind conditions with each sounding of the alarm.

SUMMARY OF THE INVENTION

According to the present invention, a compass is modified to include certain electrical connections and is coupled in circuit with a power supply, such as a battery, and with an alarm. As with conventional compasses, a compass rose is mounted in freely rotatable fashion relative to and in electrical isolation from a housing or bowl. The compass rose is rotatably mounted upon a jewel typically located at the top of a jewel support post extending upwardly from the bottom of the housing in the center of the compass.

The compass rose typically is a flat disk of non-ferrous metal and has parallel magnets mounted on its underside. The magnets on the underside of the compass rose always point toward the magnetic North Pole. As a consequence, the compass rose turns relative to the compass housing as the boat shifts position at anchor with changes in wind direction. The wind blows the boat, swinging the boat on its anchor line so that the boat is always approximately downwind from its anchor. This is true whether the boat is anchored to a net set in the sea, or to an anchor dropped to the sea bottom. In either event the boat will be blown downwind of its point of anchor, and will be carried in an arc tethered at the end of its anchor line by a shifting wind.

In a compass modified according to the invention, an electrical connection is established from the power supply to the compass rose. This connection may take the form of a whisker wire which makes a very light electrical contact with the collar of the compass rose. The whisker wire exerts virtually no pressure on the collar of the compass rose, so as not to retard rotation of the compass rose relative to the compass housing. An electrical contact, which may be a wire that forms a transverse bar, is secured to the compass rose centerpost. The collar of the compass rose provides an appropriate location at which to mount the laterally extending electrical connection. An electrical path is thereby established from the contact bar, through the whisker wire, to one terminal of the power supply and an electrical circuit to an alarm.

The compass housing is provided with at least two limit contacts. The limit contacts may take the form of depending posts extending downwardly from fixed locations on the top of the compass housing. Alternatively, the limit contacts may take the form of stiff metal wires or arms mounted in the top of the compass and extending in radially diverging fashion from a location directly above the center of the compass rose. The cantilevered ends of the electrical limit contacts turn downward from the ends of the radial limit contact arms. When the boat is rotated in an arc by a shift in wind direction, the compass rose will continue to point to the magnetic North Pole, but the compass housing will turn with the boat. A sufficient wind change will bring the electrical contact on the compass rose into electrical contact with the down-turned feet on one or more of the limit contact arms. This closes the otherwise open electrical circuit, thereby activating the alarm. The crew of a fishing boat is thereby aroused and alerted once a wind shift beyond allowable variations in wind direction has occurred.

The limit contacts on the top of the compass may be fixed to depend downward from contact posts located 180 degrees apart, relative to the compass rose, in the top of the compass. In a typical implementation of the method of the invention, the compass housing is initially positioned so that the terminal posts are aligned athwartship perpendicular to the alignment of the keel alignment of the boat. When the boat is anchored from either the bow or stern the keel will be aligned along the direction of the wind. The compass housing may be rotatably mounted in a cradle which is fixed relative to the hull of the boat. The limit contacts define an arc of 180 degrees. If the compass housing is initially aligned so that the electrical contact on the compass rose is midway between the two limit contact posts, the alarm will sound if the wind subsequently shifts 90 degrees in either direction.

Alternatively, a variable arcuate range of acceptable wind shift variation may be established if the limit contacts are adjustably movable relative to the compass housing. A small arc established at the normal swing angle of the boat may be defined by positioning the limit contacts from 60 to 90 degrees apart with the contact on the compass rose initially centered in this arc. Even a small wind shift will thus cause the alarm to sound. Alternatively, the limit contacts may be set at even a wider arc where a greater tolerance in variations of wind direction is acceptable. The limit contacts may be constructed to be adjusted together or independently of each other.

According to the practice of the method of the invention, the bow or stern of a vessel will be pointed into the wind when the vessel is at anchor, depending upon whether the vessel is bow anchored or stern anchored. Either the compass housing or the limit contacts on the top of the compass are rotated to initially position the limit contacts in spaced separation from the electrical contact on the compass rose when the vessel is riding in its normal orientation at anchor. If there is a significant wind shift, the wind will cause the boat to swing in an arc, tethered by the anchor line. The movement of the boat rotates the compass housing while the compass rose remains pointed in a north-south direction. When the wind has shifted sufficiently, either or both of the limit contacts will establish an electrical path through the contact on the compass rose. This closes the electrical circuit to the alarm, thus actuating the alarm. The crew is thereby alerted to the wind shift, and can reposition or reanchor the vessel as necessary.

While the system of the invention has particular application to commercial gill net fishing, it is equally applicable to any situation where detection of a significant wind shift is desired. For example, the system of the invention is quite useful when either commercial or pleasure vessels are anchored so near to shore that they can be blown aground with a significant shift in wind direction. Also, a marked shift in wind direction is sometimes accompanied by a severe change in weather, often accompanied by strong winds. The system and method of the invention provide early warning to such a developing weather condition.

The invention can be described with greater clarity and particularity by reference to the accompanying drawings.

DESCRIPTION OF THE EMBODIMENTS AND IMPLEMENTATION OF THE METHOD OF THE INVENTION

Figure 1:
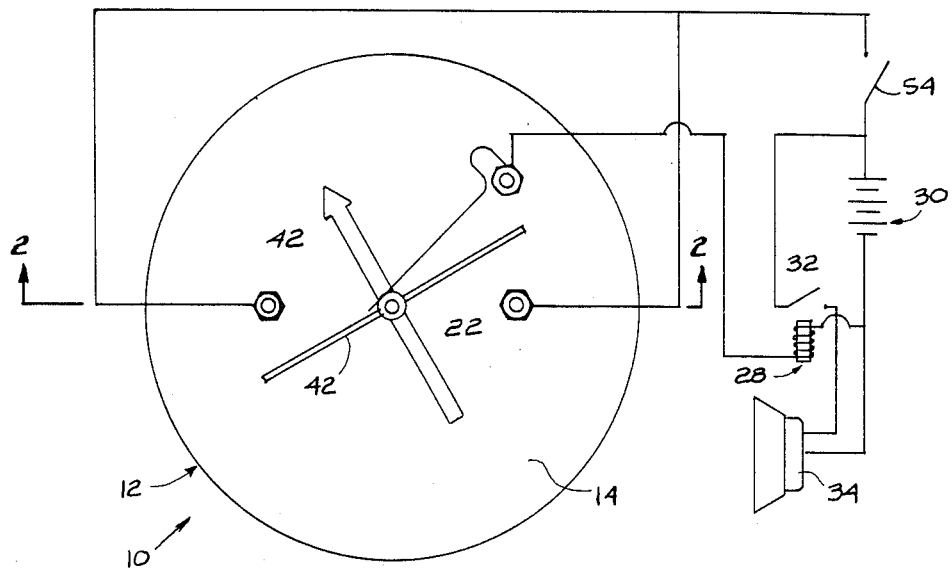
FIG. 1 is a top plan diagramatic view of one embodiment of the system of the invention.
Figure 6:
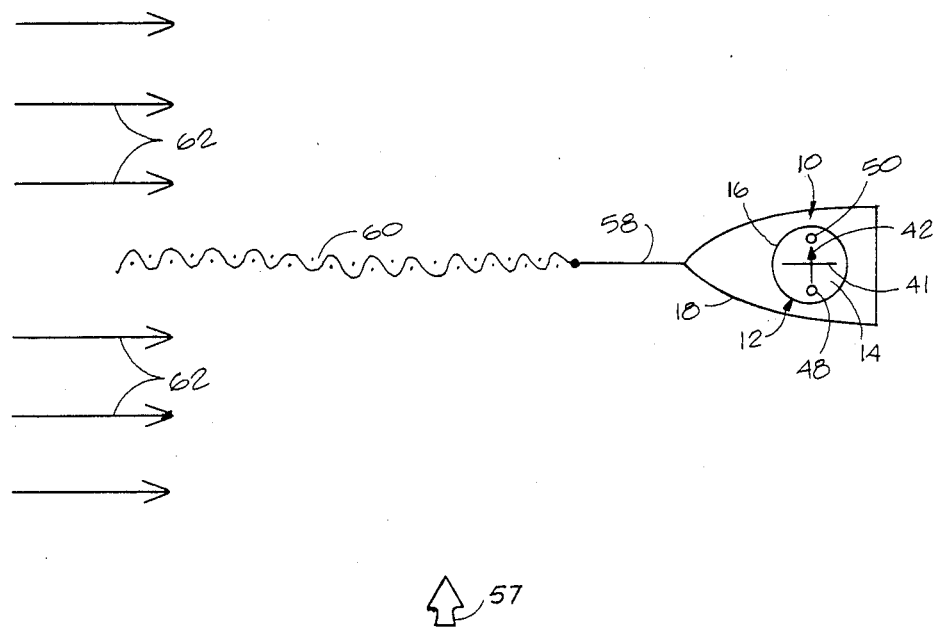
FIG. 6 is a top plan diagram illustrating the method of the invention when a vessel is first anchored.
Figure 7:
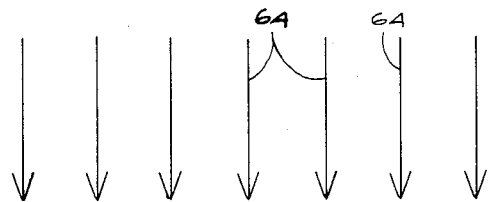
FIG. 7 is a top plan diagram illustrating the method of the invention when a significant shift in wind has occurred.
Figure 7:
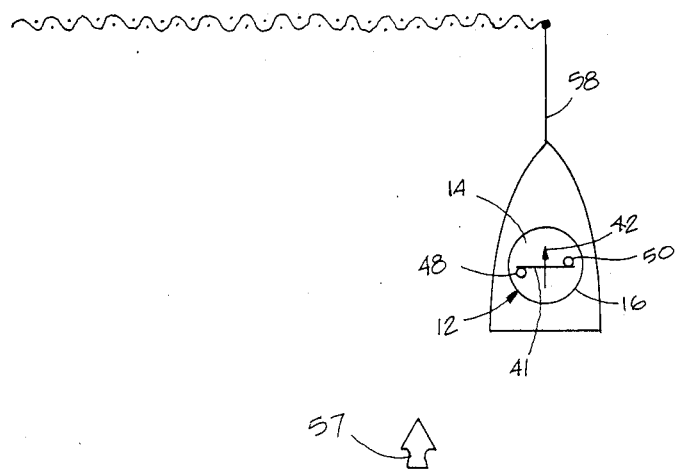

FIG. 1 illustrates an alarm system 10 for detecting shifts in wind direction on a vessel afloat, at anchor, and subject to movement by the wind. The alarm system 10 is comprised of a compass 12 having a compass rose 14 formed of a non-ferrous metallic disk, such as aluminum approximately 0.020 inches in thickness. The compass rose 14 is freely rotatable within a bowl or housing 16, which is mounted on a vessel 18, as depicted in FIGS. 6 and 7. The compass 12 may be any commercially available marine compass and is modified to include electrical circuitry as hereinafter described. The alarm system 10 includes an electrical connection in the form of a whisker wire 20. The whisker wire 20 may be silver plated copper wire 0.010 inches in diameter. However, platinum or tungsten wire 0.005 inches in diameter is preferable. Whatever the wire construction, the whisker wire 20 provides a path of electrical conduction from the collar 22 of the compass rose 14, through a vertical rod 24 to a terminal post 26, and through the coil of a relay 28 to the negative terminal of a conventional 12 volt storage battery 30. The battery 30 serves as the power supply for the system. The normally open contact 32 of the relay 28, when actuated, closes a circuit from the battery 30 to an audible alarm 34 which may take the form of an Archer PIE alerting buzzer rated at 4 to 28 volts. The relay 28 may be an Archer subminiature 12 volt DC DPDT relay which draws 10 milliamperes and allows a current of one ampere to flow to the alarm 34 from the battery 30. Any suitable type of alarm, such as a bell, horn, or siren may be employed in place of the buzzer indicted.

On the underside of the compass rose 14 there are a pair of magnets 36 arranged parallel to each other. The magnets 36 cause the compass rose 14 to rotate freely upon the jewel 38 at the upper extremity of the upright jewel support post 40 which extends vertically upwardly from the center of the bottom of the housing 16. The compass rose 14 is thereby gimbaled on the jewel 38 so that the indicia arrow 42 imprinted on the compass rose 14 always points to the magnetic North Pole. The compass rose collar 22 is also formed of a non-ferrous metal, such as aluminum. A transverse wire, rod or T-bar 41 is soldered to the upper extremity of the compass rose collar 22 and is arranged parallel to the plane of the compass rose 14. The rod 41 is preferably formed of a thin wire of the same construction as the whisker wire 20.

Limit contacts 44 and 46 depend downwardly from terminal posts 48 and 50 in the transparent, insulating plastic roof 52 of the compass housing 16. The limit contact posts 44 and 46 are mounted to the housing 16 at fixed locations in the roof 52 spaced 180 degrees apart relative to the housing 16 and compass rose 12, as illustrated in FIG. 1. The limit contact post terminals 48 and 50 are connected in parallel to an activating 3 ampere capacity switch 54, which in turn is connected to the positive terminal of the battery 30.

Preferably, the wire connections from the battery 30 are constructed of 16 gauge stranded wire, and all of the other electrical wire connections external to the compass are 22 gauge solid insulated copper wire. The terminal post 26 and the limit contact terminal posts 48 and 50 are all through top fittings and include posts ⅜ inches long and 6/32 brass round head screws with wires soldered to them. One thirty second inch jeweler's silver solder composed of 4% silver and 96% tin may be used. The holes in the roof 52 which receive the posts of the contact teminals are 9/64 inches in diameter, sealed with epoxy at both top and bottom. Washers and nuts are externally located on each terminal post on the top side of the roof 52.

FIGS. 6 and 7 illustrate the method of the invention. The directional indicia 57 designate the direction of the magnetic North Pole. As illustrated in FIG. 6, the fishing vessel 18 is tethered by an anchor line 58 which is connected to a conventional gill net 60. The gill net 60 serves as a sea anchor and the fishing vessel 18 is always tethered to the leeward end of the net 60. FIG. 6 illustrates the fishing vessel 18 as it is initially anchored to the gill net 60 when the wind is blowing from the West as denoted by the directional arrows 62. As with conventional compasses, the indicia 42 of the compass rose 14 points to the magnetic North Pole.

Preferably, the compass housing 16 is seated in a cradle so as to be rotatable within the cradle relative to the fishing vessel 18. The housing 16 of the compass 12 is initially rotated within its cradle to an orientation such that the limit contact terminals 48 and 50 are located in transverse alignment perpendicular to the keel line of the vessel 18. When the vessel 18 is anchored by a bow line, as depicted in FIG. 6, the bow of the vessel 18 will always point into the wind. With the wind blowing from the West as depicted in FIG. 6, the compass rose indicia 42 will point to the magnetic North Pole and the contact rod 41 will be aligned in an East-West direction in alignment with the keel of the vessel 18. The limit contact terminals 48 and 50 are oriented into mutual alignment in a North-South direction on opposite sides of the contact rod 41 so as to define allowable variations in wind direction. Since the alignment of the limit contact posts 48 and 50 is perpendicular to the alignment of the rose contact rod 41, an allowable variation in wind direction of 90 degrees is defined in either direction.

Figure 2:
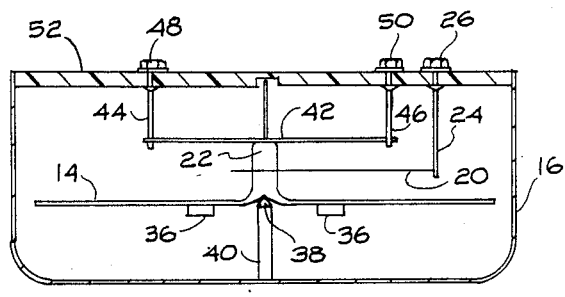
FIG. 2 is a sectional elevational view taken along the lines 2—2 of FIG. 1.

As is evident from FIG. 6, there is an incomplete electrical path between the contact rod 41 and the limit contact posts 44 and 46, visible in FIG. 2. Consequently an open circuit condition initially exists even when the switch 54 is closed.

FIG. 7 illustrates the condition which will exist if the wind shifts in direction by 90 degrees. As illustrated by the directional indicia 64, the wind direction has changed from the westerly breeze of FIG. 6 to a northerly direction. As a result, the vessel 18 swings in an arc of 90 degrees about its anchor line 58. Since the gill net 60 extends deep beneath the surface of the water, its orientation is largely unaffected by wind direction.

When the vessel 18 has swung at anchor from the orientation of FIG. 6 to the orientation of FIG. 7, it carries with it the compass housing 16. The compass rose 14 will naturally remain oriented so that the directional indicia 42 continues to point to the magnetic North Pole. However, since the vessel 18 and the compass housing 16 have been rotated by 90 degrees, the compass rose contact rod 41 establishes physical contact with the limit contacts 44 and 46 depending from the limit contact terminals 48 and 50, respectively. This closes the electrical circuit, to actuate the relay 28 to sound the buzzer 34. That is, when the vessel 18 has swung at anchor in response to the shift in wind direction from West to the North, as illustrated in FIG. 7, a complete electrical path exists as illustrated in FIGS. 1 and 2 from the negative terminal of the battery 30, through the coil of the relay 28, the terminal post 26, the whisker wire 20, the compass rose collar 22, the contact rod 41, the limit contacts 44 and 46 and the contact terminals 48 and 50 to the closed switch 54 and the positive terminal of the battery 30. When the coil of the relay 28 is actuated the relay contact 32 closes to sound the buzzer 34.

It may well be that even with a 90 degree wind shift, it will be unnecessary to reanchor the vessel 18. However, if the vessel 18 has shifted from the disposition of FIG. 6 to the orientation of FIG. 7, only a slightly further shift will result in fouling of the net 60. Accordingly, when the vessel 18 has swung to the position of FIG. 7, and the alarm 34 has sounded, it is advisable to adjust the housing 16 of the compass 12 relative to the hull of the vessel 18 from the orientation depicted in FIG. 7 to the orientation depicted in FIG. 3. When the housing 16 is reoriented to the position depicted in FIG. 3, a further clockwise wind shift of substantially less than 90 degrees will rotate the vessel 18 and the compass housing 16. This rotates the contact terminals 48 and 50 to the positions indicated in phantom at 48' and 50' to again sound the alarm 34. That is, if the wind continues to move clockwise from the North, as depicted in FIG. 7, further toward the East through an acute angle of perhaps 30 degrees, further rotation of the housing 16 of the compass 12 through the same angle will again cause the alarm 34 to sound. A further clockwise wind shift through the angle A will cause the limit contact terminals 48 and 50 to move from the positions indicated in solid lines to the positions indicated at 48' and 50' in phantom in FIG. 3. The alarm 34 will again then sound so that the vessel 18 can be reanchored to the opposite end of the net 60.

Figure 3:
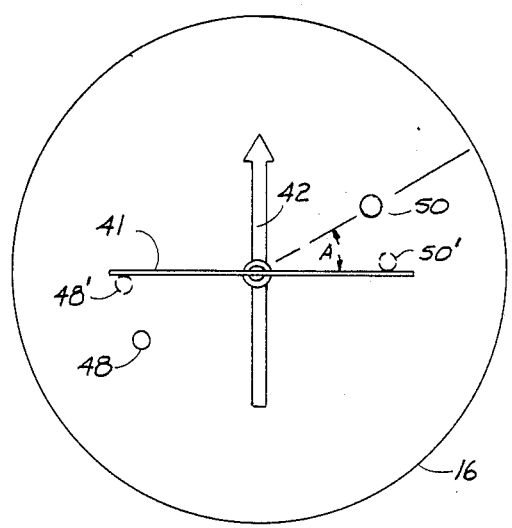
FIG. 3 is a top plan diagram illustrating the operation of the embodiment of FIGS. 1 and 2.

The embodiment of FIGS. 1 and 2 can thereby define an acceptable range of wind direction variation in both clockwise and counterclockwise directions. The range in each direction can be selectively adjusted, but the total variation is 180 degrees. That is, when the housing 16 is oriented as depicted in FIG. 3, a clockwise wind shift of only about 30 degrees will cause the alarm 34 to sound, but a counterclockwise wind direction shift will sound the alarm 34 only after the wind has shifted through an arc of 150 degrees.

Figure 4:
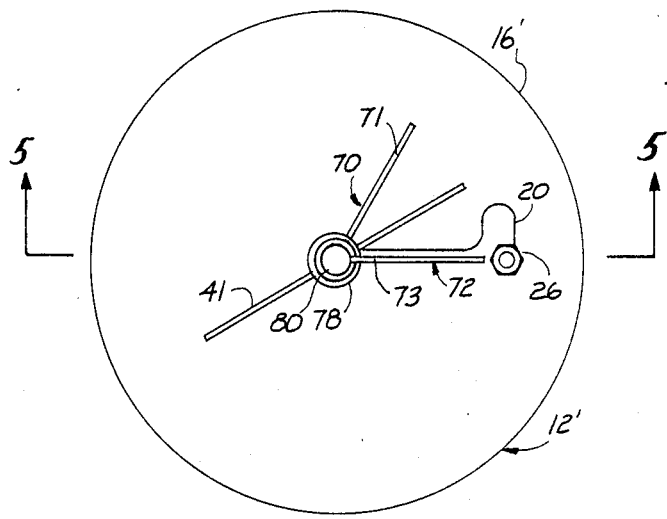
FIG. 4 is a top plan diagram illustrating an alternative embodiment of the system of the invention.
Figure 5:
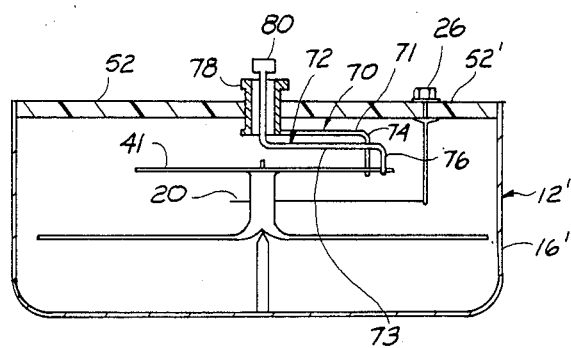
FIG. 5 is a sectional elevational view taken along the lines 5—5 of FIG. 4.

FIGS. 4 and 5 illustrate an alternative embodiment of the invention in which the limit contacts are separately adjustable in position independently of each other and relative to the compass housing or bowl 16'. In the embodiment of FIGS. 4 and 5 the limit contacts 70 and 72 do not depend downwardly at fixed locations in the top 52 of the compass 12, but rather are each of overall Z-shaped configuration. That is, the limit contacts 70 and 72 include transverse arms 71 and 73, respectively which extend radially outwardly relative to the center of the compass 12. At the tips of the radial arms 71 and 73 of the limit contacts 70 and 72 are turned downwardly to form depending lightweight feet 74 and 76. When the compass housing 16 turns sufficiently relative to the compass rose 14, the end of the contact rod 41 will touch either the wire foot 74 of the limit contact 70 or the foot 76 of the limit contact 72, depending upon the direction of wind shift. The limit contacts 70 and 72 are connected in circuit with a battery, the same as the limit contact posts 48 and 50 in the embodiment of FIGS. 1 and 2.

The radial orientation of the limit contacts 70 and 72 are separately adjustable and may be moved relative to the compass housing 16' independently of each other. The limit contact 70 includes a tubular bushing 78 which protrudes from the roof or top 52' of the compass 12'. The bushing 78 is rotatable relative to the housing 16' within an annular opening in the top 52 of the compass housing 16' so that the radial arm 71 of the limit contact 70 can be oriented in any desired direction.

The limit contact 72 includes a vertical rod 80 which is oriented concentrically within the tubular bushing 78, and is independently rotatable relative thereto. Both the bushing 78 and the rod 80 are connected to the positive terminal of a battery. As is evident from FIGS. 4 and 5, the locations of the limit contacts 70 and 72 can each be rotatably adjusted to define any angle between 0 and 180 degrees of acceptable wind direction variation in either direction.

The system of the invention provides a unique, yet simple means of detecting shifts in wind direction on a floating vessel which is anchored in the sea. The connection of the electrical circuitry depicted in FIG. 1 has the distinct advantage that there is no electrical current flow forming a current drain except during an alarm condition. Also there is no current to disrupt the orientation of the compass rose 14 relative to the housing 16 until, or unless, the alarm 34 has sounded. The jewel 38 serves as an insulator, as does the plastic top 52 of the compass housing 16 to prevent any flow of electrical current unless contact is established between the compass rose contact rod 41 and either or both of the limit contacts.

Undoubtedly, numerous variations and modifications of the invention are possible. For example, a U-shaped compass rose contact may be employed in place of the linear rod 41, and L-shaped depending limit contacts may be employed in association therewith. Numerous variations in contact configuration and orientation and various compass designs may be employed. Accordingly, the scope of the invention should not be construed as limited to the specific embodiments and manners of implementation of the method of the invention depicted and described, but rather is defined in the claims appended hereto.

I claim:

1. A method of detecting wind shifts on a vessel afloat comprising:
   providing said vessel with a compass means having a compass jewel and a rose with magnet means thereof mounted in a housing and rotatable about said jewel, and an electrical circuit closure actuating means disposed radially from said jewel and rotatable with said rose, and with limit contact means having a pair of normally open limits contacts located on said housing,
   anchoring said vessel using an anchor so that said vessel rides directly downwind from said anchor tethered by an anchor line extending between said anchor and said vessel, whereby said vessel is free to swing in an arc about said anchor in response to shifts in wind direction,
   initially orienting said limit contact means relative to said compass rose so that said limit contacts are located on both sides of said electrical circuit closure actuating means to define allowable variations in wind direction, and
   connecting said limit contact means in circuit with an alarm and a power supply, whereby said electrical circuit closure actuating means actuates said limit contact means to close at least one of said normally open limit contacts when said rose rotates on said jewel to bring said electrical circuit closure actuating means into radial alignment with said limit contact means when a change in wind direction beyond one of said allowable variations repositions said vessel relative to said anchor.

2. A method according to claim 1 further comprising orienting said limit contact means by moving said limit contact means relative to said housing.

3. A method according to claim 2 further comprising orienting ech of said pair of limit contacts relative to said housing independently of each other.

4. A method according to claim 1 further comprising orienting said limit contact means by fixedly mounting said limit contact means relative to said housing and rotatably adjusting the position of said housing relative to said vessel.

5. In a method of detecting shifts in wind direction on a floating, anchored vessel, the improvement comprising: providing said vessel with a compass having a compass housing, a jewel located within said compass housing and a rose rotatable about said jewel and having a magnet means thereon, providing said compass rose with electrical circuit closure actuating means radially disposed from said jewel, providing said compass with limit contact means having a pair of normally open limit contacts and located on said housing, connecting said contact means in circuit with a power supply and an alarm, initially locating said limit contacts on opposite sides of said electrical circuit closure actuating means, and orienting said limit contact means relative to said compass rose to define an acceptable range of wind direction variation, whereby a change in wind direction beyond said acceptable range reorients said vessel and said housing thereon to bring said electrical circuit closure actuating means into radial alignment with said limit contact means, whereby said electrical circuit closure actuating means closes at least one of said normally open contacts of said contact means, thereby providing electrical current to said alarm.

6. A method according to claim 5 further comprising rotatably adjusting the locations of said limit contacts relative to said housing.

7. A method according to claim 5 further comprising fixedly securing said limit contacts relative to said housing and orienting said limit contact means by rotatably adjusting the position of said housing on said vessel.

8. An alarm system for detecting shifts in wind direction on a vessel afloat, and at an anchor comprising:
   a deployed anchor having an anchor line connected to said anchor and said vessel so that said vessel rides directly downwind from said anchor tethered by said anchor line, whereby said vessel is free to swing in an arc about said anchor in response to shifts in wind direction,
   a compass having a compass rose freely rotatable about a compass jewel within a compass housing mounted on said vessel,
   an electrical power supply,
   an alarm,
   limit contact means having a pair of normally open limit contact elements located on said housing,
   electrical circuit closure actuating means radially disposed relative to said jewel and rotatable with said compass rose,
   electrical connection means electrically connecting said power supply to said alarm through said normally open contact elements of said limit contact means, wherein said limit contact elements are initially located on opposite sides of said electrical circuit closure actuating means to estabish a range of acceptable wind shifts, and whereby a wind shift beyond said acceptable range reorients said vessel relative to said anchor to rotate said housing and bring said electrical circuit closure actuating means into radial alignment with said limit contact means so that said electrical circuit closure actuating means thereupon closes at least one of said normally open contact elements.

9. An alarm system according to claim 8 further characterized in that said limit contact means is comprised of two elements initially located on opposite sides of said electrical circuit closure actuating means and said elements are independently adjustable in position relative to said housing.

10. An alarm system according to claim 8 further characterized in that said elements of said limit contact means are fixed to said housing and spaced 180 degrees apart.

* * * * *